United States Patent [19]

Perry

[11] 4,436,191

[45] Mar. 13, 1984

[54] AUTOMOBILE HAND CONTROL

[76] Inventor: William E. Perry, 9417 Delancey Dr., Vienna, Va. 22180

[21] Appl. No.: 330,785

[22] Filed: Dec. 15, 1981

[51] Int. Cl.³ .................................................. B60K 41/20
[52] U.S. Cl. ....................................... 192/3 S; 192/3 T; 91/422; 74/482
[58] Field of Search ................... 192/3 S, 3 T, 3 R, 1; 91/422, 383; 180/335; 74/481, 482, 484

[56] References Cited

U.S. PATENT DOCUMENTS

| | | | |
|---|---|---|---|
| 2,022,370 | 11/1935 | Dick | 188/356 X |
| 2,036,619 | 4/1936 | Brown et al. | 192/3 T |
| 2,731,850 | 1/1956 | Otto et al. | 74/484 |
| 2,777,335 | 1/1957 | Engberg et al. | 192/3 S |
| 2,855,797 | 10/1958 | Dunn | 74/484 |
| 2,875,638 | 3/1959 | Sell | 74/484 |
| 2,899,835 | 8/1959 | Moreland | 192/3 S |
| 3,192,794 | 7/1965 | Counts | 74/481 |
| 3,439,784 | 4/1969 | Wittner | 74/482 X |

Primary Examiner—George H. Krizmanich
Attorney, Agent, or Firm—Mason, Fenwick & Lawrence

[57] ABSTRACT

A vehicle hand operated engine throttle and brake control system has a dash-mounted and operator actuated pivotable tubular control arm with a rotary knob on its outer end. A cable has a first end being drivingly connected to the knob on the control arm and a second end connected to a throttle on the vehicle carburetor so that rotation of the knob controls the carburetor.

A vacuum operated power assist means is connected to the cable for aiding in movement of the cable against the force of the throttle spring and for maintaining the cable in any given position of adjustment. A rod connects the control arm to the brake on the vehicle so that pivotal movement of the control arm controls the vehicle brakes.

21 Claims, 6 Drawing Figures

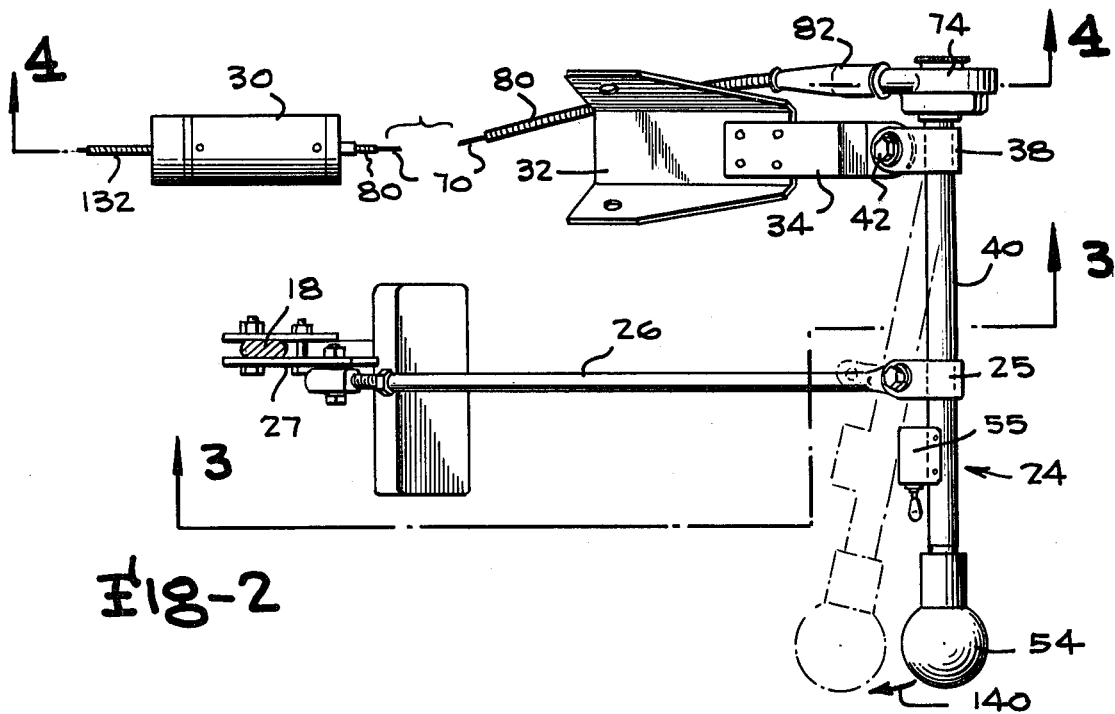
Fig-2
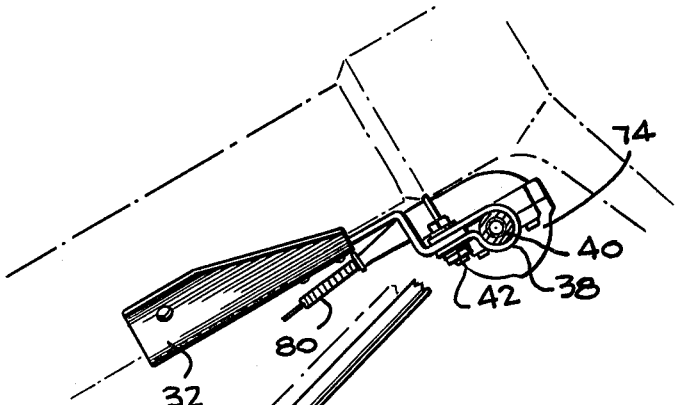
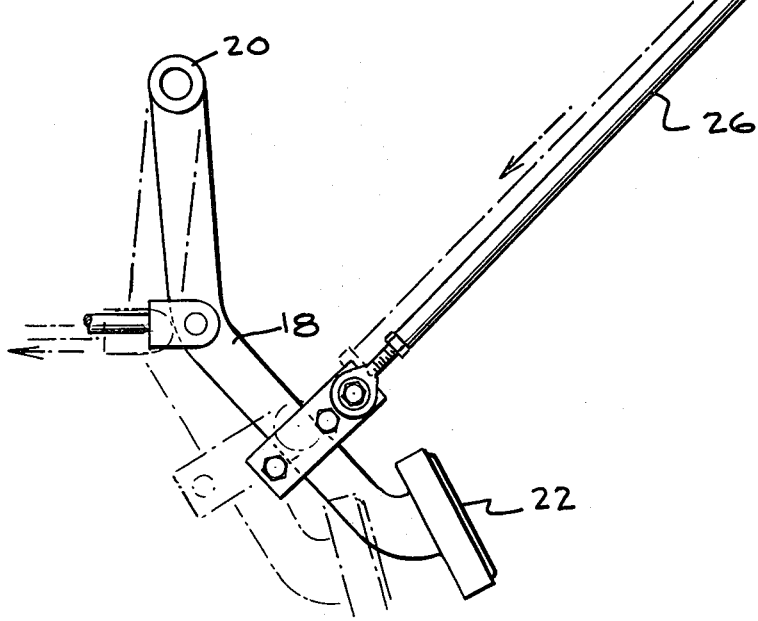
Fig-3

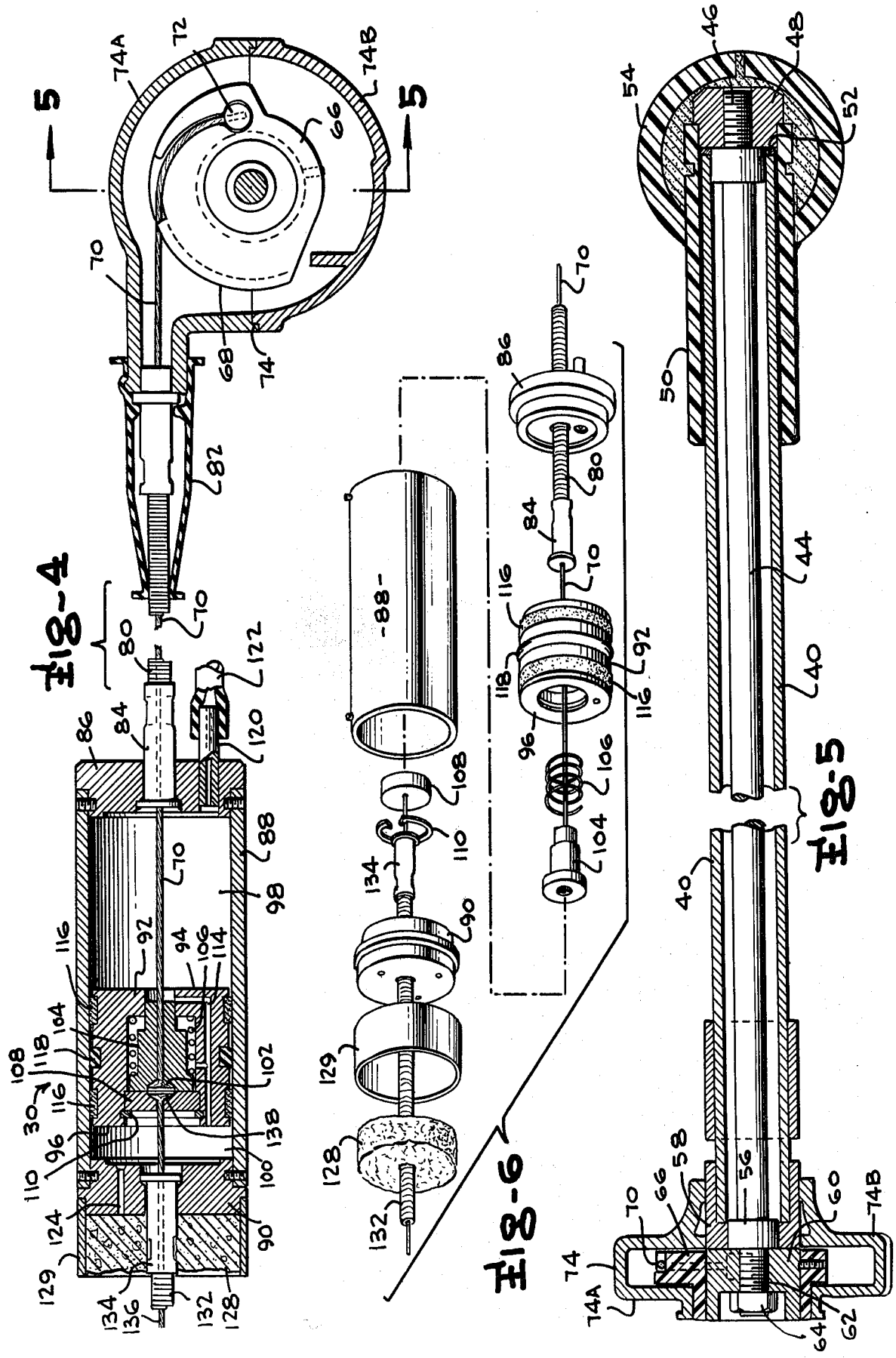

AUTOMOBILE HAND CONTROL

BACKGROUND OF THE INVENTION

The present invention is in the field of control devices for manually controlling movable mechanical elements and, in its preferred embodiment, is directed to a hand-operated system for controlling the throttle and brakes of a vehicle such as an automobile or the like.

A wide variety of devices have been proposed in the past for permitting the hand control of the throttle and brake functions of an automobile so as to permit physically incapacitated drivers that are incapable of operating foot controls to operate conventional vehicles. Unfortunately, the prior known devices have frequently suffered from a number of shortcomings such as requiring a substantial modification of the vehicle at substantial expense and resulting in loss of the ability to operate the vehicle in the normal manner using the foot controls. A number of prior devices such as exemplified by U.S. Pat. No. 3,192,794 employ individual handle members for the brake and accelerator pedals which fact requires substantial manual dexterity on the part of the operator. Other devices such as those exemplified in U.S. Pat. Nos. 2,731,850; 2,855,797; and 2,875,638 have provided a single lever or control member for both the throttle and brake control function; however, devices of this type have operated in a manner which precludes the simultaneous operation of both the brake and the throttle so as to create driving difficulty in circumstances where is it desirable to operate both the brake and throttle simultaneously. For example, with devices of the foregoing type it is impossible to apply the throttle and the brakes simultaneously such as when beginning movement of the vehicle on a steep incline, and there is a momentary lapse in control of the vehicle as the lever is moved from the braking to the throttle applying position. The driver consequently does not have complete control of the vehicle and such a problem can be particularly acute on slippery streets where the throttle may be over applied so as to cause wheel spin and loss of control of the vehicle.

Avoidance of the foregoing problems has been partially achieved by the device of U.S. Pat. No. 2,899,835 in which a pivotal brake lever and an accelerator pedal are operated by the left hand of the driver with it being possible to provide for simultaneous actuation of both the brakes and the accelerator. However, the throttle application is through a cable system requiring constant tension on the throttle actuator and precluding normal foot operation of the vehicle. Additionally, none of the prior known hand-control devices permits both simultaneous brake and throttle operation in conjunction with the capacity of maintaining the throttle in a set position of adjustment during constant speed highway cruising so as to avoid fatigue of the control hand of the driver.

Yet another problem with the prior known hand-control devices for automobiles is that the mechanical connection between the hand controls and the throttle are subject to considerable friction and do not function smoothly as is desirable for proper operation of the vehicle.

Therefore, it is a primary object of this invention to provide a new and improved hand control system for a vehicle.

A further object of the present invention is the provision of a new and improved hand control system for a vehicle requiring the manipulation of only a single control member for controlling both the brake and throttle functions of the vehicle and permitting the simultaneous application of the brakes and actuation of the throttle.

Yet another object of the present invention is the provision of hand-operated throttle control means in which auxiliary force is provided for positioning the throttle in a desired position of adjustment and for retaining the throttle in such position so as to eliminate the need for maintaining constant force on the hand control member.

Yet another object of the present invention is the provision of a hand operated power control device in which the control force is supplemented to require a minimum of manual effort for moving a positioned member to a desired position of adjustment and maintaining the positioned member in such position of adjustment without the need for any further restraining force on the hand-control element of the system.

SUMMARY OF THE INVENTION

Achievement of the foregoing objects is enabled by the preferred embodiment of the invention which is directed to a hand-controlled throttle and brake control means for a vehicle in which the hand control element comprises a lever mounted for pivotal movement adjacent to the steering column of the vehicle. The control lever consists of a tubular control arm having a rotary knob at its outer end with a rod connected to the knob and extending through the tubular control arm to a cable drum mounted on the extreme end of the rod. The cable drum is connected to a power assist means consisting of a pneumatic piston and cylinder assembly through which the cable extends for connection to the throttle lever of the carburetor of the vehicle. The piston and cylinder assembly is connected to the vacuum system of the automobile so that rotary movement of the knob actuates valving means in the piston and cylinder arrangement which results in application of an aiding force by the piston applied to the cable for effecting movement of the cable to a desired position of throttle adjustment. Valving means inside the piston and cylinder assembly then serves to maintain the piston in the selected position of adjustment until the cable is again moved by the manual rotation of the knob on the outer end of the control lever to effect a readjustment of the throttle position. It is consequently possible once the throttle has been adjusted to permit it to remain in the position of adjustment to the ease and convenience of the operator. Application of the brakes of the vehicle is effected by a rod extending from the tubular control arm to the brake pedal support lever so that pivotal movement of the control arm effects application of the vehicle brakes. It is consequently possible to pivot the control arm to apply the brakes while simultaneously rotating the knob on the outer end of the arm for opening the throttle. Since the throttle position is determined solely by the relative position of the knob, it is always possible to have a reference with respect to the degree of throttle opening.

The use of the power assist means is of particular advantage to persons not having strong muscular systems as are frequently necessary for usage of any of the prior known hand control vehicle devices.

A better understanding of the structure and operation of the preferred embodiment will be achieved when the following detailed description is considered in conjunction with the appended drawings in which like reference numerals are used for the same parts as illustrated in the different drawing figures.

BRIEF DESCRIPTION OF THE DRAWING

FIG. 2 is a plan view of portions of the preferred embodiment;

FIG. 3 is a side elevation view of a portion of the preferred embodiment illustrating a portion thereof employed for controlling the brakes of an automobile;

FIG. 4 is a bisecting sectional view of a portion of the preferred embodiment taken along lines 4—4 of FIG. 2;

FIG. 5 is a bisecting sectional view of a control handle portion of the preferred embodiment taken along lines 5—5 of FIG. 4; and FIG. 6 is an exploded perspective view of power assist means employed in the preferred embodiment.

DESCRIPTION OF THE PREFERRED EMBODIMENTS

Figure 1:
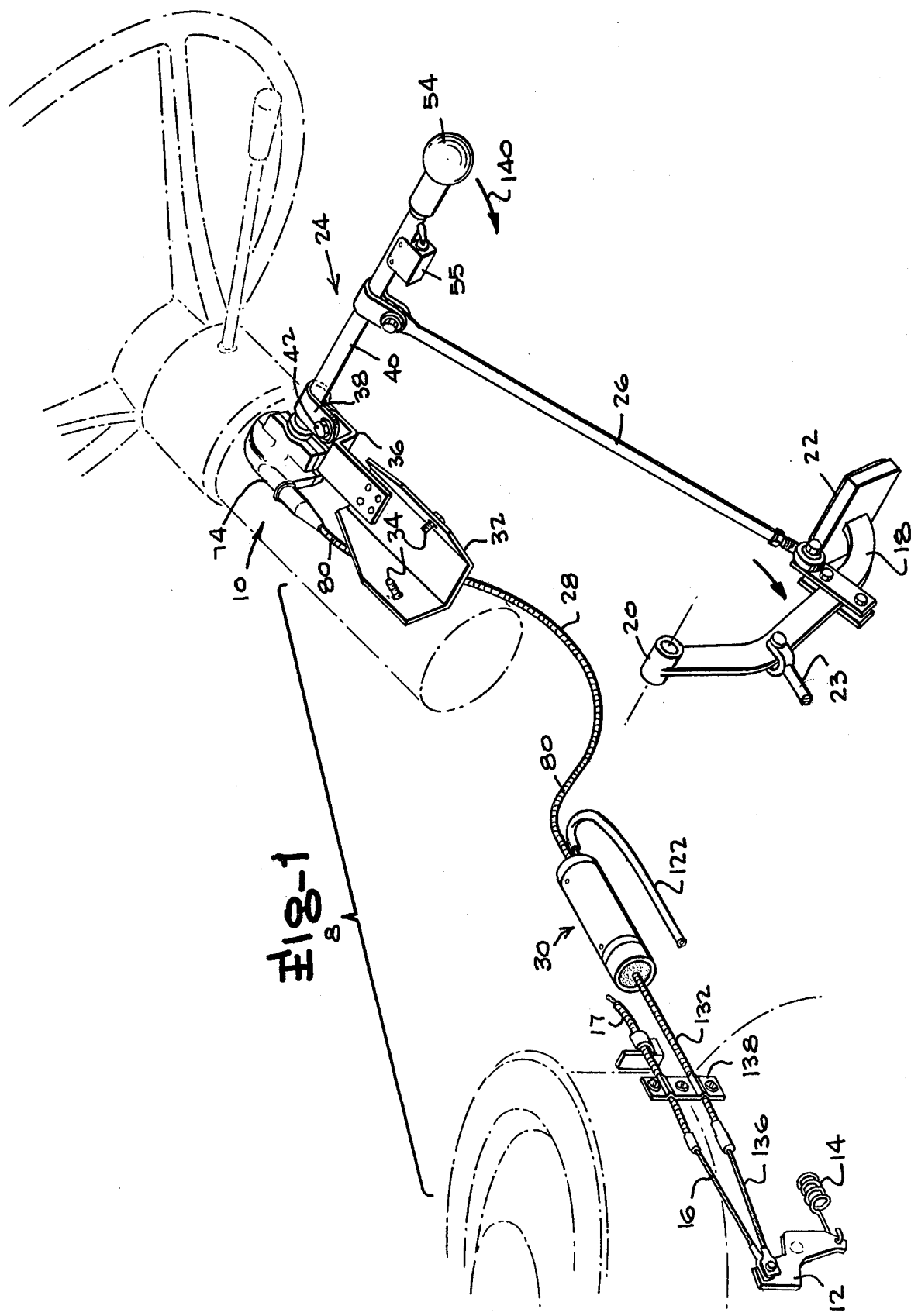
FIG. 1 is a perspective view of the preferred embodiment of the invention as installed in a vehicle such as an automobile.

Attention is initially invited to FIG. 1 of the drawings which illustrates the preferred embodiment of the invention, generally designated 8, as installed in an automobile or other vehicle having a steering column housing 10 and a carburetor assembly including a throttle 12 in the form of a lever connected to a spring 14 tending to position the throttle in a closed or idle position. A conventional cable 16 having a cable sheath 17 extends from the accelerator peddle of the automobile, which is not shown, and is connected to the lever 12 in a conventional manner. Additionally, the automobile includes a conventional brake lever 18 having a pivot bushing 20 at one end mountable on a pivot shaft in the dash housing of the automobile in a well-known manner so that application of foot pressure to a pedal 22 actuates a rod 23 connected to the master cylinder to control the brakes of the automobile.

The preferred embodiment of the invention consists of an operator actuated movable control member 24 which is connected through a clamp 25, a rigid rod 26, and clamp 27 to the brake lever 18; control member 24 is also connected by cable means 28 to the throttle lever 12 with a power assist means 30 being associated with the cable for a purpose to be discussed in detail hereinafter.

The manual control member 24 is attached to and supported by the steering column housing 10 by means of a channel-shaped bracket plate 32 and bolt or screw members 34 with a carrier plate 36 extending upwardly from the bracket 32 and providing pivotal support for a tube clamp 38 clamped about the outer surface of a hollow tubular control arm 40. A pivot pin 42 provides pivotal support for the tubular control arm 40 and tube clamp 38 so that these elements pivot about the axis of pin 42 as illustrated by the solid line and phantom line illustrations of element 40 as shown in FIG. 2. It should be understood that the invention is not limited to the configuration of plates 32, 34, etc. as shown in the drawings since these elements will obviously have to vary in size and shape in accordance with different types of automobiles or other vehicles in which the preferred embodiment is to be installed.

The manual control member 24 includes an axially extending internal rod 44 extending axially within the tubular control arm 40 and having a threaded outer end portion 46 on which a sleeve cap 48 is threadably mounted. A sleeve 50 extends from the sleeve cap 48 and is matingly fitted over the outer surface of the tubular control arm 40 as shown. A teflon thrust washer 52 provides a low friction contact between the sleeve cap 48 and the outer end of the tubular control arm 40 so as to permit the easy rotation of sleeve cap 48 with respect to the rod 40. Additionally, a resin filled knob 54 encloses the sleeve cap 48, etc. and is bonded to the sleeve 50. Consequently, rotation of the knob 54 easily effects corresponding rotation of the rod 44. A conventional headlight dimmer switch 55 is also provided on control arm 40.

The end of rod 44 opposite the end on which knob 54 is positioned includes an enlarged bearing 56 mounted for rotation in a bearing cap 58 secured to the end of tubular control arm 40. A carrier hub 60 is held in position on an outer end portion 62 of rod 44 by a nut 64 positioned in an axial recess in the carrier hub 60 as shown. Carrier hub 60 is fixedly held on the outer end portion 62 of shaft 44 so as to rotate therewith. A cable drum 66 is mounted on and fixedly connected to the outer surface of the carrier hub 60 and includes a peripheral slot 68 in which the end of a first cable section 70 of cable 28 is positionable with a conventional retainer ball 72 on the end of the cable being positioned in a mating recess of the cable drum 66 so as to hold the cable end in position on the drum. It should be noted that the cable drum 66 is a conventional item of the type frequently employed for actuating a throttle cable of a motorcycle. A drum enclosing shroud 74 is fitted over the drum and is fixedly connected to the bearing cap 58 as best shown in FIG. 5. The drum enclosing shroud 74 is formed of two components 74A and 74B to permit access to the interior thereof as required.

Cable means 28 includes a first cable sheath portion 80 enclosing the first cable section 70 and connected by a conventional coupling means 82 to the drum enclosing shroud 74 as shown in FIG. 4. The opposite end of cable sheath portion 80 includes a flanged tube 84 mounted in a first end wall 86 fixedly positioned on the end of a tubular metal body 88. The interior of which defines a cylindrical space which is closed at its opposite end by a second end wall 90 with a piston 92 being mounted for axial movement in the body 88. Piston 92 includes a first end face 94 and a second end face 96 so that the piston serves to divide the cylindrical cavity within body 88 into a first cylindrical chamber 98 extending between the first end face 94 and the inner surface of first end wall 86 and a second cylindrical chamber 100 extending between the second end face 96 of the piston and the inner surface of the second end wall 90 as best shown in FIG. 4. It should be observed that the cylindrical chambers 98 and 100 will vary in volume in accordance with the position of piston 92.

A second end of the first cable section 70 is secured at 102 to a movable spool 104 mounted for axial movement in a cylindrical axially positioned bore extending through the piston 92. A compression spring 106 urges spool 104 to the left against a cable coupler disc 108 held in fixed position in the piston by a conventional retainer clip 110. A pressure equalizing passageway 114 extends through the piston 92 to connect the first and second chambers 98 and 100 when the spool 104 is in the spring-urged position of FIG. 4 so that the chambers 98 and 100 are maintained at substantially the same pressure. However, it should be observed that the spool 104 can be moved to the right into blocking relationship with the pressure equalizing passageway 114 upon rightward movement of the first cable section 70. Piston 92 includes teflon slide bearing rings 116 extending about its periphery on opposite sides of a seal member 118 so that the piston 92 is easily reciprocated within the confines of the cylinder defined by the interior of the body member 88. It should also be observed that a nipple 120 extends through the first end wall 86 and is connected to a vacuum hose 122 extending through a source of vacuum associated with the engine of the automobile or other vehicle in which the device is installed. A vent 124 extends through the second wall 90 so as to connect the second cylindrical chamber 100 with the atmosphere. A low-pressure-drop filter 128 is provided externally of the wall 90 to preclude the entry of contaminants into the second cylindrical chamber 100 via the vent 124. Filter material 128 is held in position by a sleeve 129.

A second cable sheath portion 132 has an end connected in a flanged coupler tube 134 mounted in the second end wall 90 of the power assist means 30 and encloses a second cable section 136 having a first end connected at 138 to the cable coupler disc 108 fixedly positioned inside the piston 92. The second cable section 136 is axially movable with respect to the second cable sheath portion 132 in a well-known manner as is the first cable section 70 with respect to the first cable sheath portion 80.

The second cable section 136 has a second end connected to the throttle arm or lever member 12 as shown in FIG. 1. It should be observed that the second cable sheath portion 132 is fixedly positioned with respect to the carburetor and other engine components by a clamp plate 138 which also serves to clamp the sheath 17 for the cable 16 extending to the accelerator pedal of the vehicle.

In operation, if the operator of the vehicle wishes to apply the brakes of the vehicle, he simply moves the knob 54 downwardly in the direction of arrow 140 in order to cause the rigid rod 26 to move the brake lever 18 to effect application of the brakes. Reverse movement of knob 54 obviously releases the brakes. Such brake control movement is simply a pivotal movement of the tubular control arm 40 about the axis of pivot pin 42 and does not have any effect on the throttle linkage cable means 80, 70, 136, etc.

Throttle control, on the other hand, is effected by rotating the knob 54 in a clockwise direction as viewed in FIG. 1 so as to cause the first cable section 70 to be moved to the right as viewed in FIG. 4. Such rotation is for the purpose of opening the throttle of the vehicle with the initial movement of the cable section 70 serving to cause spool 104 to be moved from its position in FIG. 4 to the right to block the pressure equalizing passageway 114. Since vacuum line 122 is connected to a source of vacuum, the higher atmospheric pressure in the second cylindrical chamber 100 acts on the second end face 96 of piston 92 to urge the piston to the right to follow and aid the movement of the first cable section 70. Such rightward movement of the piston 92 is immediately conveyed to the second cable section 136 which is also consequently shifted to the right to provide a resultant movement of the throttle lever 12 against the bias of spring 14. When the operator of the vehicle terminates rotation of knob 54, the first cable section 70 immediately stops movement and the spring 106 causes the spool 104 to move to its open position of FIG. 4 in which the pressure equalizing passageway 114 is unblocked so that pressure on opposite sides of the piston 92 in the chambers 98 and 100 equalizes and the piston tends to remain in a stabilized position with there being a slight excess pressure in chamber 100 sufficient to resist the force of the throttle spring 14. Thus, the power assist apparatus 30 serves to aid in positioning the throttle and in retaining the throttle in position upon termination of rotation of the knob 54. When it is desired by the operator to close the throttle, the knob 54 is simply rotated in a reverse direction so that a sufficient amount of force is applied to the piston by cable 70 which in conjunction with the force of spring 14 serves to move the piston 92 to the left end of the cylindrical chamber. Movement of the piston consequently results in movement of second cable section 136 and pivoted movement of throttle lever 12 to its closed or idle position.

It should be clearly understood that while the preferred embodiment of the invention is disclosed as being used in conjunction with the throttle control of a vehicle, the spirit and scope of the invention is not limited to such usage since the power assist means 30 could obviously be used in a wide variety of other devices requiring similar control. In fact, the device is not limited to the usage of cable control members since rigid rods or the like could also be used in place of the cable sections 70 and 136. Therefore, the spirit and scope of the present invention is to be limited solely by the appended claims.

I claim:

1. A vehicle control system for a vehicle having a throttle having a throttle spring tending to move the throttle to a closed position, said system including:
    an operator actuated movable control member;
    cable means having first and second ends with said first end being connected to said movable control member and said second end being connected to an engine throttle so that movement of the control member results in movement of the cable means and consequent movement of the engine throttle; and
    air pressure actuated power assist means connected to said cable means for aiding in movement of said cable against the force of said throttle spring and for maintaining said cable means in any given position of adjustment while permitting a subsequent movement of the cable to a subsequent position of adjustment in response to subsequent movement of said movable control member.

2. The invention of claim 1 wherein said air pressure actuated power assist means includes:
    a body defining a hollow cylinder having first and second ends;
    a piston mounted for movement in said cylinder so as to divide the cylinder into first and second chambers respectively extending from said first and second ends of the cylinder to first and second side faces of said piston; and
    wherein said cable means is connected to said piston so that any pressure differential across said piston provides a resultant application of force to said cable means.

3. The invention of claim 1 wherein said power assist means comprises:
    a body defining a cylinder having first and second ends;
    a piston having first and second side faces and mounted for movement in said cylinder intermediate the first and second ends thereof so as to divide said cylinder into a first chamber extending from said first end of said cylinder to said first side face of said piston and a second chamber extending from said second end of said cylinder to said second side face of said piston;

wherein said cable means extends axially through said cylinder between the first and second ends thereof and also extends axially through and is connected to said piston; and further including air flow control means for creating a pressure differential on opposite sides of said piston in said cylinder for providing a resultant force on said piston tending to overcome the force of said throttle spring means.

4. The invention of claim 3 wherein said air flow control means includes:

a source of vacuum connected to said first chamber;

a pressure equalizing passageway communicating said first chamber to said second chamber;

vent means communicating said second chamber with atmosphere; and valving means for closing said pressure equalizing passageway in response to movement of said cable in a direction against the biassing force of said throttle spring to create a pressure differential across the piston to aid in such movement of said cable.

5. The invention of claim 1 wherein said power assist means comprises:

a body defining a cylinder having first and second ends;

a piston having first and second side faces and mounted for movement in said cylinder intermediate the first and second ends thereof so as to divide said cylinder into a first chamber extending from said first end of said cylinder to said first side face of said piston and a second chamber extending from said second end of said cylinder to said second side face of said piston;

wherein said cable means extends axially through said cylinder between the first and second ends thereof and also extends axially through and is connected to said piston;

further including air flow control means for creating a pressure differential on opposite sides of said piston in said cylinder for providing a resultant force on said piston tending to overcome the force of said throttle spring means, said air flow control means including:

a source of vacuum connected to said first chamber;

a pressure equalizing passageway extending through said piston and communicating said first chamber to said second chamber;

vent means communicating said second chamber with atmosphere; and valving means in said piston for closing said pressure equalizing passageway in response to movement of said cable in a direction against the biassing force of said throttle spring to create a pressure differential across the piston to aid in such movement of said cable.

6. The invention of claim 1 wherein said power assist means comprises:

a body defining a cylinder having first and second ends;

a piston having first and second side faces and mounted for movement in said cylinder intermediate the first and second ends thereof so as to divide said cylinder into a first chamber extending from said first end of said cylinder to said first side face of said piston and a second chamber extending from said second end of said cylinder to said second side face of said piston;

wherein said cable means extends axially through said cylinder between the first and second ends thereof and also extends axially through and is connected to said piston;

further including air flow control means for creating a pressure differential on opposite sides of said piston in said cylinder for providing a resultant force on said piston tending to overcome the force of said throttle spring means, said air flow control means including:

a source of vacuum connected to said first chamber;

a pressure equalizing passageway extending through said piston and communicating said first chamber to said second chamber;

vent means communicating said second chamber with atmosphere;

a movable spool valve means mounted in a bore extending through said piston for movement between a first position in which said pressure equalizing passageway is not blocked and a second position in which said pressure equalizing passageway is blocked to create a pressure differential across the piston to aid in such movement of said cable to effect opening of the throttle;

valve spring means for urging said spool valve means toward its first position;

said cable means being connected to said movable spool valve so that movement of said cable means in a first direction shifts the valve spool so that said pressure equalizing passageway is blocked.

7. The invention of claim 6 wherein said cable means comprises first and second cable sections each having first and second ends;

the first and second ends of said first cable section being respectively connected to said movable control member and to said spool valve means;

the first and second ends of said second cable section being respectively connected to said piston and to said engine throttle; and further including first and second cable sheath members respectively enclosing said first and second cable sections and each having first and second ends.

8. The invention of claim 7 additionally including brake control means connected to said movable control member and wherein said movable control member includes:

a tubular control arm having first and second ends mounted for pivotable movement on a fixed support about a transverse axis adjacent its second end;

a rotary rod having first and second ends and extending axially internally along the length of said tubular control arm;

a cable drum mounted on the second end of said rotary rod and wherein the first end of the first cable section is connected to the cable drum;

a control knob mounted on the first end of the rotary rod adjacent the first end of said tubular control arm; and rigid rod means extending from said tubular control arm to the brake lever of the vehicle for actuating the brakes of the vehicle in response to pivotal movement of the tubular control arm.

9. The invention of claim 1 additionally including brake control means connected to said movable control member and wherein said movable control member includes:
  a tubular control arm having first and second ends mounted for pivotable movement on a fixed support about a transverse axis adjacent its second end;
  a control knob positioned adjacent the first end of said tubular control arm; and
  rigid rod means extending from said tubular control arm to the brake lever of the vehicle for actuating the brakes of the vehicle in response to pivotal movement of the tubular control arm.

10. The invention of claim 9 wherein said air pressure actuated power assist means includes:
  a body defining a hollow cylinder having first and second ends;
  a piston mounted for movement in said cylinder so as to divide the cylinder into first and second chambers respectively extending from said first and second ends of the cylinder to first and second side faces of said piston; and
  wherein said cable means is connected to said piston so that any pressure differential across said piston provides a resultant application of force to said cable means.

11. The invention of claim 9 wherein said power assist means comprises:
  a body defining a cylinder having first and second ends;
  a piston having first and second side faces and mounted for movement in said cylinder intermediate the first and second ends thereof so as to divide said cylinder into a first chamber extending from said first end of said cylinder to said first side face of said piston and a second chamber extending from said second end of said cylinder to said second side face of said piston;
  wherein said cable means extends axially through said cylinder between the first and second ends thereof and also extends axially through and is connected to said piston; and
  further including air flow control means for creating a pressure differential on opposite sides of said piston in said cylinder for providing a resultant force on said piston tending to overcome the force of said throttle spring means.

12. The invention of claim 11 wherein said air flow control means includes:
  a source of vacuum connected to said first chamber;
  a pressure equalizing passageway communicating said first chamber to said second chamber;
  vent means communicating said second chamber with atmosphere; and
  valving means for closing said pressure equalizing passageway in response to movement of said cable in a direction against the biassing force of said throttle spring to create a pressure differential across the piston to aid in such movement of said cable.

13. A power control system for moving a controlled element against a biassing force tending to move the controlled element toward a first position, said system including:
  an operator actuated movable control member;
  connector means having first and second ends with said first end being connected to said movable control member and said second end being connected to said controlled element so that movement of the control member results in movement of the connector means and consequent movement of the controlled element; and
  air pressure actuated power assist means connected to said connector means for aiding in movement of said connector means against the bias of said force exerting means and for maintaining said connector means in any given position of adjustment while permitting a subsequent movement of the connector means to a subsequent position of adjustment in response to subsequent movement of said movable control member.

14. The invention of claim 13 wherein said air pressure actuated power assist means includes:
  a body defining a hollow cylinder having first and second ends;
  a piston having first and second side faces mounted for movement in said cylinder so as to divide the cylinder into first and second chambers respectively extending from said first and second ends of the cylinder to said first and second side faces of said piston; and
  wherein said connector means is connected to said piston so that any pressure differential across said piston provides a resultant application of force to said connector means.

15. The invention of claim 13 wherein said power assist means comprises:
  a body defining a cylinder having first and second ends;
  a piston mounted for movement in said cylinder intermediate the first and second ends thereof;
  said connector means extending through said cylinder between the first and second ends thereof and also extending through and connected to said piston; and
  air flow control means for creating a pressure differential on opposite sides of said piston in said cylinder for providing a resultant force on said piston tending to overcome the force of said throttle spring means.

16. The invention of claim 15 wherein said air flow control means includes:
  a source of vacuum connected to said first chamber;
  a pressure equalizing passageway communicating said first chamber to said second chamber;
  a vent communicating said second chamber with atmosphere; and
  valving means for closing said pressure equalizing passageway in response to movement of said cable in a direction against the biassing force of said force exerting means to create a pressure differential across the piston to aid in movement of said force exerting means.

17. The invention of claim 13 wherein said connector means comprises cable means extending axially through said cylinder between the first and second ends thereof and also extending axially through and connected to said piston; and wherein said power assist means comprises:
  a body defining a cylinder having first and second ends;
  a piston having first and second side faces and mounted for movement in said cylinder intermediate the first and second ends thereof so as to divide said cylinder into a first chamber extending from said first end of said cylinder to said first side face of said piston and a second chamber extending from said second end of said cylinder to said second side face of said piston; and further including air flow control means for creating a pressure differential on opposite sides of said piston in said cylinder for providing a resultant force on said piston tending to overcome the biassing force on said controlled element, said air flow control means including:

a source of vacuum connected to said first chamber;

a pressure equalizing passageway extending through said piston and communicating said first chamber to said second chamber;

vent means communicating said second chamber with atmosphere; and valving means in said piston for closing said pressure equalizing passageway in response to movement of said cable in a direction against the biassing force on said controlled element to create a pressure differential across the piston to aid in such movement of said cable.

18. The invention of claim 13 wherein said connector means comprises cable means extending axially through said cylinder between the first and second ends thereof and also extending axially through and connected to said piston; and wherein said power assist means comprises:

a body defining a cylinder having first and second ends;

a piston having first and second side faces and mounted for movement in said cylinder intermediate the first and second ends thereof so as to divide said cylinder into a first chamber extending from said first end of said cylinder to said first side face of said piston and a second chamber extending from said second end of said cylinder to said second side face of said piston; and further including air flow control means for creating a pressure differential on opposite sides of said piston in said cylinder for providing a resultant force on said piston tending to overcome the biassing force on said controlled element, said air flow control means including:

a source of vacuum connected to said first chamber;

a pressure equalizing passageway extending through said piston and communicating said first chamber to said second chamber;

vent means communicating said second chamber with atmosphere; and a movable spool valve means mounted in a bore extending through said piston for movement between a first position in which said pressure equalizing passageway is not blocked and a second position in which said pressure equalizing passageway is blocked to create a pressure differential across the piston to aid in such movement of said cable to effect opening of the throttle;

valve spring means for urging said spool valve means toward its first position;

said cable means being connected to said movable spool valve so that movement of said cable means in a first direction shifts the valve spool so that said pressure equalizing passageway is blocked.

19. An engine throttle control system for a throttle having a throttle spring tending to move the throttle to a closed position, said system including:

an operator actuated movable control member;

cable means having first and second ends with said first end being connected to said movable control member and said second end being connected to an engine throttle so that movement of the control member results in movement of the cable means and consequent movement of the engine throttle; and power assist means connected to said cable means for aiding in movement of said cable against the force of said throttle spring and for maintaining said cable means in any given position of adjustment without requiring any maintenance of force on the movable control member by the operator.

20. The invention of claim 19 wherein said power assist means includes:

a body defining a hollow cylinder having first and second ends;

a piston mounted for movement in said cylinder so as to divide the cylinder into first and second chambers respectively extending from said first and second ends of the cylinder to first and second side faces of said piston;

wherein said cable means is connected to said piston;

means for creating a pressure differential across said piston in response to cable movement in a throttle opening direction to provide a resultant application of force to said cable means to aid in its movement in the throttle opening direction; and means for equalizing the pressure on both sides of the piston in response to static positioning of the cable means.

21. The invention of claim 20 wherein said power assist means is connected to a source of vacuum for providing a pressure differential in the cylinder.

* * * * *